US006695325B2

(12) United States Patent
Carrillo

(10) Patent No.: US 6,695,325 B2
(45) Date of Patent: Feb. 24, 2004

(54) MULTIPURPOSE MOBILE PAINT CADDY

(76) Inventor: Alex L. Carrillo, 1209 Cambridge, Berkley, MI (US) 48072

( * ) Notice: Subject to any disclaimer, the term of this patent is extended or adjusted under 35 U.S.C. 154(b) by 5 days.

(21) Appl. No.: 10/000,937

(22) Filed: Nov. 24, 2001

(65) Prior Publication Data

US 2002/0056967 A1 May 16, 2002

Related U.S. Application Data

(60) Provisional application No. 60/249,352, filed on Nov. 16, 2001.

(51) Int. Cl.$^7$ .............................. B62B 3/00; B62B 1/00
(52) U.S. Cl. ................. 280/47.34; 280/79.5; 280/47.16
(58) Field of Search ............................ 280/47.34, 47.2, 280/47.18, 47.16, 79.5, 47.11, 47.131, 47.17, 47.24, 47.26, 47.35, 47.371, 47.44, 79.11, 79.2, 79.3; 172/329, 351, 354, 355, 356; 16/110.1, 443; 220/505, 506, 571, 573, 737, 741, 908

(56) References Cited

U.S. PATENT DOCUMENTS

| | | | | | |
|---|---|---|---|---|---|
| 2,840,384 A | * | 6/1958 | Bard | ......................... | 280/47.37 |
| 2,862,220 A | * | 12/1958 | Orr | ............................ | 15/246.4 |
| 3,558,152 A | * | 1/1971 | Miles et al. | ............. | 280/47.16 |
| 4,354,637 A | * | 10/1982 | Tidwell | ...................... | 239/184 |
| 4,635,951 A | * | 1/1987 | Berfield et al. | .......... | 280/47.34 |
| 5,046,749 A | * | 9/1991 | Owens | ....................... | 280/79.5 |
| 5,556,118 A | * | 9/1996 | Kern et al. | ............... | 280/47.16 |
| 5,806,867 A | * | 9/1998 | Hampton | ................. | 280/47.34 |
| 6,027,128 A | * | 2/2000 | Stich | ........................ | 280/47.16 |
| 6,053,516 A | * | 4/2000 | Ottaway | .................... | 280/79.5 |

FOREIGN PATENT DOCUMENTS

| JP | 405016814 A | * | 1/1993 | ............. 280/47.16 |
|---|---|---|---|---|

* cited by examiner

*Primary Examiner*—Frank Vanaman
*Assistant Examiner*—Gerald B. Klebe
(74) *Attorney, Agent, or Firm*—The Weintraub Group, P.L.C.

(57) ABSTRACT

A multipurpose paint caddy comprises: a frame; a T-handle for moving and manipulating the frame; containment structure for positioning a paint bucket on the top side of the frame and for storing paint apparatus in juxtaposition with the paint bucket; and a wheel arrangement for facilitating rolling and tilting movement of the frame whereby to obviate obstacles encountered during movement of the frame on the ground. In a preferred wheel arrangement, two pairs of swivelable small diameter wheels extends below each end portion of the frame, and two pairs of non-swivelable large diameter wheels extends below the central portion of the frame. The handle and one pair of large diameter wheels enables the user to transmit a pivoting force to one end of the frame, whereupon the small diameter wheels adjacent thereto are driven into engagement with the ground and the large diameter wheels at the other frame end lifted.

18 Claims, 2 Drawing Sheets

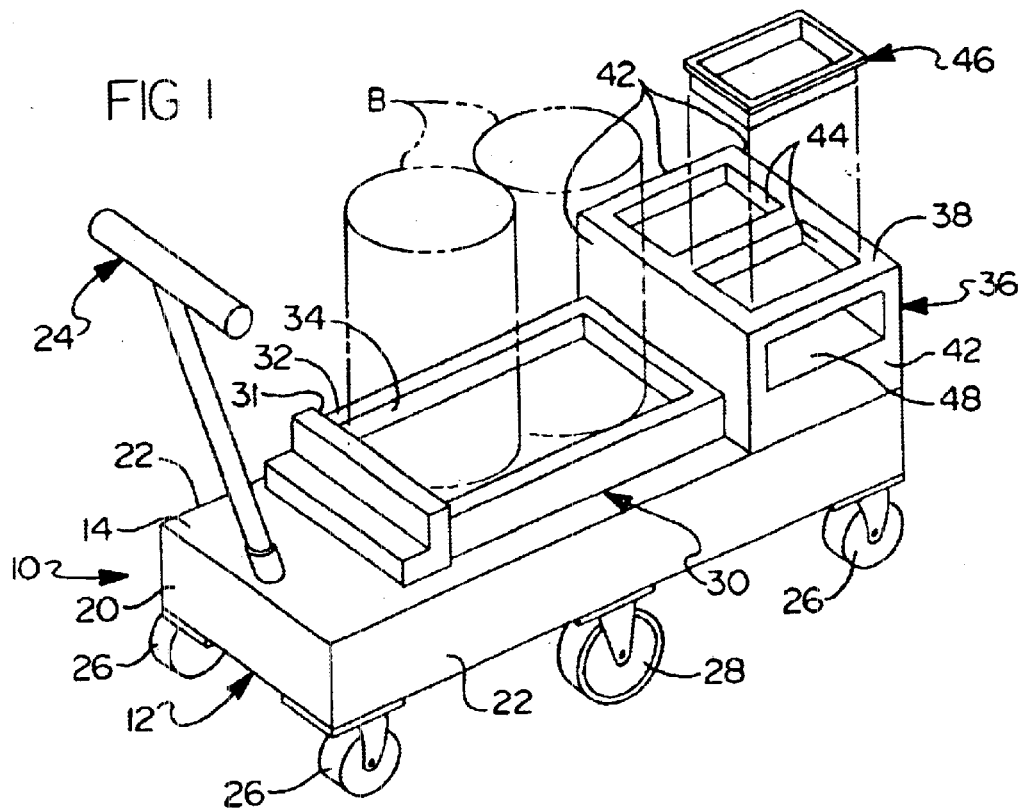
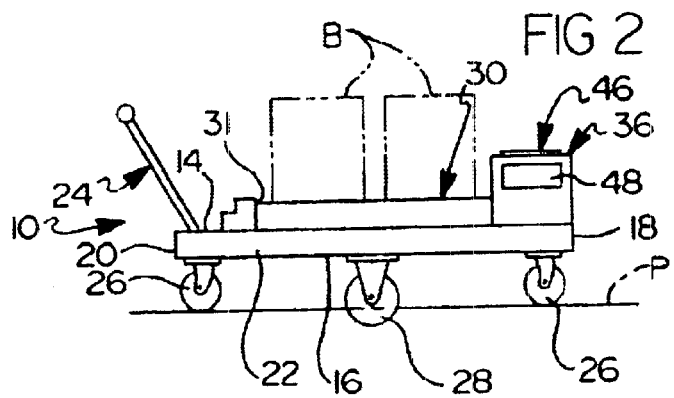
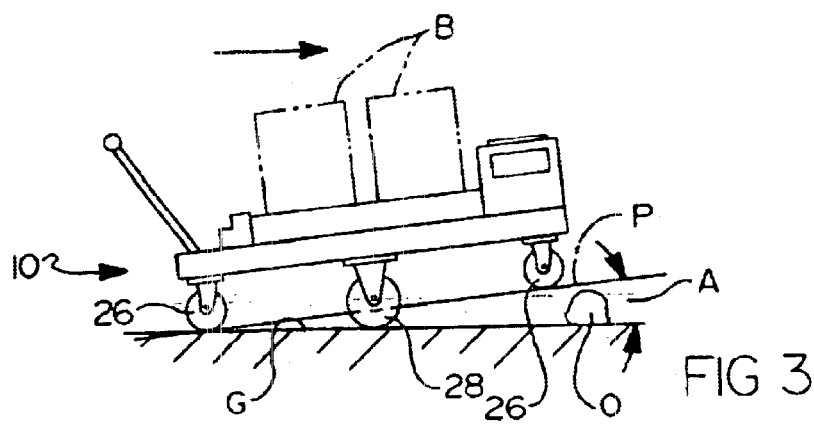

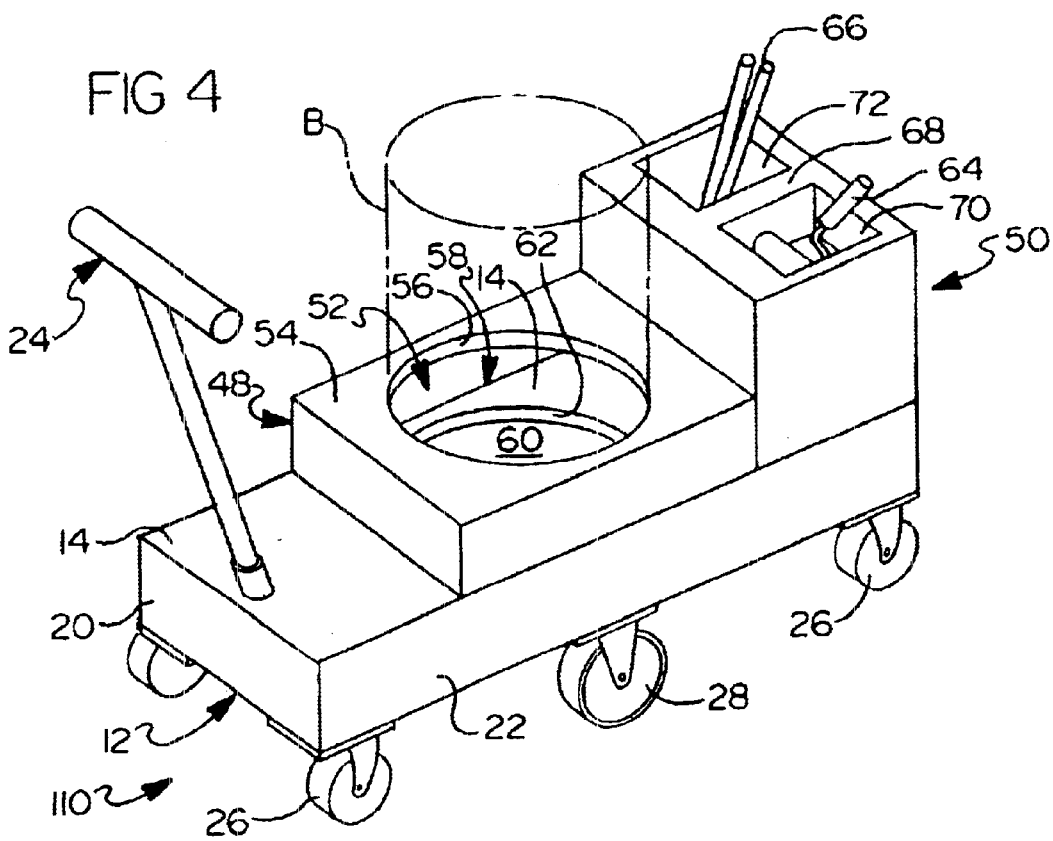
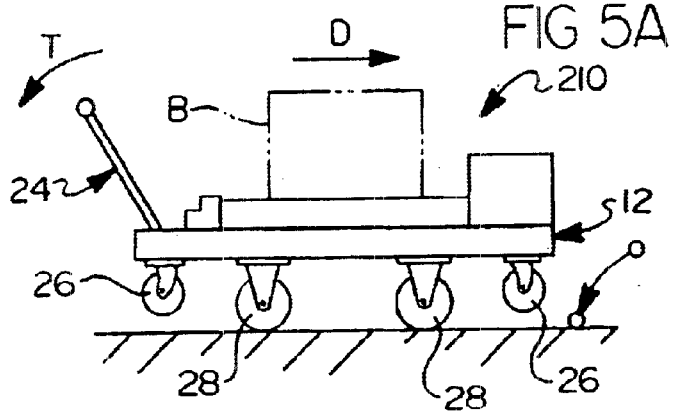
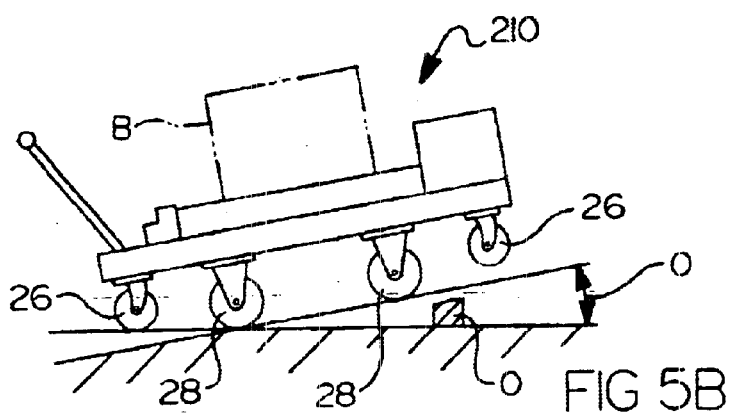

MULTIPURPOSE MOBILE PAINT CADDY

CROSS-REFERENCE TO RELATED APPLCIATIONS

This is a completion application and under 35 USC Section 119 (e) claims a priority date of Nov. 16, 2001 from co-pending U.S. Provisional Application Serial No. 60/249,352, the disclosure of which is hereby incorporated by reference.

BACKGROUND OF THE INVENTION

1. Field of the Invention

This invention relates to a mobile caddy or cart for a painter, and more particularly, to a multipurpose cart useful for transporting and supporting paint buckets, paint supplies such as brushes and rollers, and facilitating access to a paint pan or an open paint can to facilitate the painting operation.

2. Description of Related Art

Mobile and stationary apparatus for facilitating the support and transporting of supplies are known. U.S. Pat. No. 2,862,220 to Orr illustrates a dolly for a vacuum cleaner or the like. U.S. Pat. No. 2,840,384 to Bard; U.S. Pat. No. 4,635,951 to Berfield et al.; U.S. Pat. No. 5,806,867 to Hampton; U.S. Pat. No. 6,027,128 to Stich et al.; and U.S. Pat. No. 6,053,516 to Ottaway illustrate a cart for transporting one or more cylindrical cans or buckets, such as cleaning fluid or paint cans. Each of these carts is generally single purposed in that the cart generally provides the user with a means for transporting and/or supporting a specific object to and at a desired work area.

While suitable for their respective intended purposes, there is an ongoing need for improvements in mobile apparatus that enables a user to perform multiple tasks.

SUMMARY OF THE INVENTION

It is an object of the present invention to overcome deficiencies in the carts of the class described by providing a mobile cart and an arrangement thereon wherein at least one large paint bucket and paint supplies, such as the paint brushes, rollers and pan, are placed in close operable relation to one another and transported to a work site whereat the bucket is opened for use by the painter with the paint supplies therewith.

Another object of the invention is provision of an elevated support on the caddy that positions the paint pan in juxtaposition with an open paint bucket (or cans) for operable use by the paint rollers and brushes.

An advantage of such a cart or caddy so arranged is that the painter may simultaneously use all of the requisite supplies from one cart, thereby providing a cost effective apparatus for completing a paint assignment remote from a supply truck.

Another object of the invention is the provision of a paint transporting caddy that includes an array of both swiveling and non-swiveling casters, the swiveling casters being disposed at the opposite ends of the caddy, and the non-swiveling casters being centrally disposed and spaced from the caddy somewhat further than the swiveling casters, the non-swiveling casters permitting rolling motion of the caddy and cooperate to permit the frame of the caddy to be tilted relative to the ground and the center of the caddy.

Advantageously, the non-swiveling casters provide directional stability and permit the frame of the caddy to be tilted relative to the center of the caddy to enable the forward (or rearward) end of the caddy frame to be tilted whereby to overcome small obstacles that are encountered on the floor.

In a first aspect according to this invention there is provided a multipurpose paint caddy, the caddy comprising:

a frame, the frame defining a forward end, a rearward end, a pair of sides, a bottom side, and a top side, a grippable handle extending from the frame for pushing and manipulating the frame, the handle enabling the user to apply forces used to simultaneously lift up and push down the opposite ends of said frame;

means for supporting and positioning a paint bucket on the top side of the frame, means for storing paint apparatus for use on the top side of the frame in juxtaposition with the paint bucket, and means for supporting the frame for rolling movement on the ground.

Preferably and according to this invention, the means for supporting and positioning a paint bucket comprises a housing, the housing forming an upwardly open cradle or corral with at least one wall portion thereof being configured to encircle and position at least one paint bucket for vertical orientation above the top side of the frame. The wall portion may be rectangular or circular in shape, or comprise arcuate segments, and dimensioned to closely encircle the paint bucket.

In situations wherein the caddy is used to transport a single large and heavy bucket, additional support may be desirable. Accordingly, in an alternate preferred embodiment according to this invention, the frame includes a cylindrical recess to nestingly receive the bottom end portion of the bucket, and the housing includes a cylindrical wall portion (or opening) adapted to closely encircle the bucket. The cylindrical recess and opening are generally concentric, vertically spaced from one another, and cooperate to provide vertical stability to the bucket relative to the frame and inhibit the bucket from tipping over.

Further, the means for supporting paint apparatus preferably comprises a generally rectangular shaped enclosure having a pair of upwardly open chambers.

In one embodiment according to this invention, a paint roller is disassembled and the handle portions, or extenders, are separated from the roller portion. The first chamber of the enclosure forms a tray that is adapted to receive the paint roller and the second chamber forms an opening adapted to receive and vertically position the handle portions of the roller.

In another embodiment according to this invention, the first chamber is adapted to receive at least one paint pan, and the second chamber is adapted to store paint supplies. The first chamber may comprise an opening formed in a top wall of the enclosure and configured to nestingly receive the paint pan removably inserted therewithin. If desired, in some applications, the paint pan may be integrally formed as a part of the top wall of the enclosure and receive the paint directly. In a second embodiment, the first chamber is adapted to receive a paint roller and the second chamber The frame, the housing, and the enclosure may be integrally formed or separately provided and secured to one another by appropriate means. Additionally, the enclosure and housing may be integrally formed as one-piece. Desirably, a one-piece construction would enable rapid removal by the user either for cleaning or to retrofit to the frame a housing having a different bucket configuration.

Finally, the means for supporting the frame for rolling movement is characterized by two pairs of swivelable wheels and a pair of non-swivelable wheels. The swivelable wheels are each spaced a first distance from the bottom side of the frame such that the ground engaging surfaces of the wheels are coplanar. One pair of the swivelable wheels is disposed at the forward end of the frame and the other pair of the swivelable wheels is disposed at the rearward end of the frame. The non-swivelable wheels are located at the center of the frame with each wheel thereof being spaced a second distance from the bottom side of the frame. The second distance is greater than the first distance such that the ground engaging surfaces of the non-swivelable wheels are further from the frame than are the swivelable wheels.

Also and according to this invention, the means for supporting is characterized by the above-noted first and second pairs of swivelable wheels that are disposed at the forward and rearward ends of the frame and extend downwardly therefrom by first distances, and further by first and second pairs of non-swivelable wheels. The two pairs of non-swivelable wheels project downwardly from the center of the frame by second distances and operate to normally maintain the frame so as to be generally parallel to the ground surface upon which the caddy is pushed. The second distance is greater than the first distance such that the ground engaging surfaces of the non-swivelable wheels are further from the frame than are the swivelable wheels.

The swivelable wheels may comprise rollers that simultaneously enable rolling movement as well as rotation about a vertical axis.

The arrangement of swivelable and non-swivelable casters enables the frame to normally move along the ground and also to tilt whereby to allow the opposite ends of the caddy to be rotated above and thereby obviate obstacles encountered during movement of the caddy. In this regard, the handle enables the user to push as well as to apply a torque to one or the other end of the frame, whereby to tilt the frame and lift the swivelable wheel from the path of the obstacle.

The above objects and features according to the invention are pointed out with specificity in the claims annexed hereto and forming a part of this disclosure.

BRIEF DESCRIPTION OF THE FIGURES

The present invention will be more clearly understood with reference to the accompanying drawings. Throughout the various figures, like reference numbers refer to like parts in which:

FIG. 1 is a perspective view of a multipurpose mobile caddy for painters according to the present invention.

FIG. 2 is a side elevation view of the caddy shown in FIG. 1.

FIG. 3 is a side elevation view of the caddy being moved along the ground to a work location and encountering an obstacle.

FIG. 4 is a perspective view of an alternative preferred embodiment of a multipurpose mobile caddy according to the present invention.

FIGS. 5A and 5B are side elevation views of an alternative preferred embodiment of a multipurpose mobile caddy according to the present invention showing, respectively, the normal movement of the cart along the ground and also in a tilted arrangement to the ground to avoid an obstacle encountered during such movement.

DETAILED DESCRIPTION OF THE INVENTION

Turning now to the drawings, and in particular to FIGS. 1–3, a preferred embodiment of the new and improved mobile, multipurpose caddy or cart for a painter according to the present invention, generally denoted by the number 10, will be described.

The caddy 10 comprises a frame 12 that is generally rectangular in shape and adapted to transport one or more generally cylindrical paint buckets "B", or cans, barrels and the like, such as the two shown in phantom in the Figures. The frame 12 is preferably comprised of a polymeric material to reduce the weight of the overall assembly, the cost of the assembly, and to enable the caddy to be configured and marketed for use by do-it-yourselfers. The material selected would preferably be generally resistant to attack from cleaning fluids to enable the user to clean the caddy after use. In some industrial applications, although more costly, the caddy may be comprised of a stainless steel inasmuch as it will last longer and be useful in harsher painting environments.

The frame 12 has a top end (or upper side) 14, a bottom end (or lower side) 16, a forward end 18, a rearward end 20, and a pair of lateral sides 22. A T-shaped handle 24 is secured to the upper side 14 and proximate to the rearward end 20 of the frame to provide the user with a means for pushing, pulling, and/or otherwise maneuvering the caddy. The handle 24 is threadably fastened at one end thereof into a threaded socket (not shown as being conventional) formed into the frame 12. Depending on the length of the caddy 10 and the need to improve maneuverability, such as rotation of the opposite ends of the frame, the handle could be U-shaped.

Four caster wheels 26 are disposed on the bottom end 16 of the frame and proximate to the four corners thereof. The casters 26 are alike and have their respective ground engaging surfaces spaced a first distance from the bottom end 16 of the frame 12 so as to be generally coplanar with one another, each caster being adapted to swivel and permit rotational motion as well as longitudinal movement of the caddy. The ground engaging end surfaces of the casters 26 are generally disposed in the plane "P" as shown in FIGS. 2 and 3.

Preferably and according to this invention, two non-swivelable casters or rollers 28 are also disposed on the bottom end 16 of the frame, each caster 28 being proximate to a respective lateral side 22 and centrally of the frame between the opposite ends 18 and 20 thereof. The ground engaging surfaces of the non-swivelable casters 28 are spaced a like distance from the bottom end 16 of the frame, which distance is greater than that of the swivelable casters 26.

In such arrangement, the non-swivelable casters 28 at the center of the frame enable the frame 12 to tilt in a "see-saw" manner relative to the ground "G". As shown in FIG. 3, the caddy 10 has been positioned such that the swivelable casters 26 at the rearward end 20 and the non-swivelable casters 28 are engaging the ground surface "G", the plane "P" is tilted at an angle "A" to the ground, and the swivelable casters at the forward end 18 of the frame are spaced from the ground whereby the caddy may be maneuvered over an obstacle, such as an electrical or pneumatic cable, represented by the letter "O".

Preferably and according to the present invention there is provided a stepped support housing 30 on the upper side 14 of the frame 12. The stepped support housing 30 is longitudinally elongated and defines an upwardly open cradle or corral 32 with at least one wall portion 34 thereof being configured to receive and position at least one paint bucket "B" so as to project upwardly from the upper side of the frame. As shown, the housing 30 includes a stepped abutment shoulder 31 proximate to the handle, the shoulder extending vertically upwardly from the frame and adapted to abut the exterior of the bucket whereby to inhibit the bucket from tipping over. The wall portion 34 defines a generally rectangular, upwardly open receptacle that extends longitudinally between the opposite ends 18 and 20 of the frame 12. The wall portion 34 preferably abuts the exterior of the bucket(s) "B" and serves to position or otherwise prevent movement of the bucket(s) relative to the frame.

The arrangement for positioning the paint buckets could be otherwise. For example, in some applications, the wall portion could be circular, or comprise arcuate wall segments, and be dimensioned to closely encircle the outer circumference of a single paint bucket. Additionally, the housing could be configured to include a pair of vertically spaced wall portions that encircle vertically spaced portions of the paint bucket exterior whereby to inhibit the bucket from tipping over. Further, while two buckets are shown in the Figures, the number could be greater or fewer, depending on the application.

The support housing 30 may be fastened to the upper side 14 of the frame 12 by threaded fasteners, whereby the support housing may be removed, such as for cleaning or retrofitting the caddy with another paint bucket configuration. While not shown, the fastening is conventional and would be understood by one skilled in the art.

Additionally, in some applications, the frame 12 and the stepped support housing 30 may be integrally joined and formed as a one-piece assembly as by a molding process.

Further and according to this invention there is provided an arrangement for supporting a paint pan and related apparatus that the painter needs ease of access to in juxtaposition with the paint bucket(s). As shown, there is provided a generally rectangularly shaped support enclosure 36 having a horizontally disposed top wall 38, four vertically disposed sidewalls 42, at least one opening 44 formed in the top wall 38 for nestingly receiving a paint pan (or tray) removably inserted therewithin, or for storing paint supplies, such as paint brushes, paint stirrers, sand paper, masking tape and the like. Advantageously, the opening(s) 44 enables the painter to have paint ready for application by the roller and/or brush and the paint pan(s) to be removed for cleaning, or using in close proximity of the caddy.

If desired, and in some applications, a paint pan could be formed as an integral part of the enclosure 36. For example, the top wall 38 of the enclosure 36 could be formed to include both a depression (or paint receiving area) that extends downwardly therefrom and the opening 44.

While the enclosure 36 may be separately provided and secured by appropriate means to the stepped housing 30 and/or frame 12, the enclosure 30 and the stepped housing 30 are preferably integrally formed as a one-piece. Desirably, a one-piece construction would enable rapid removal by the user either for cleaning or to retrofit to the frame a housing having a different bucket configuration.

The abutment 31 in combination with the sidewall 42 facing towards the handle 24 and proximate to the wall portion 34 cooperate to restrain the paint bucket from moving and/or tipping over during maneuvering operations of the frame, such as when the frame must be tipped to obviate an obstacle encountered on the ground.

An alternative preferred embodiment of a mobile multi-purpose caddy for a painter is shown by reference to FIG. 4, the caddy generally being denoted by the number 110. The caddy 110 is similar to the caddy 10 described hereinabove in connection with FIGS. 1–3 and includes the frame 12, the handle 24, and the swivelable and non-swivelable casters and rollers 26 and 28. The caddy 110 is preferably intended to handle a single, large, generally cylindrical, and heavy paint bucket B.

The caddy 110 includes a generally rectangular-shaped housing 48 disposed medially of the frame 12, and a generally rectangular shaped enclosure or tray 50 disposed at the rearward end of the frame, the housing and enclosure each projecting upwardly from the top side 14 of the frame. The connection of the housing and enclosure 48 and 50 to the frame are as described hereinabove in connection with the caddy 10.

The housing 48 is adapted to receive and position the paint bucket (shown by the phantom lines) so that the bucket "B" is vertically supported relative to the frame 12. The housing 48 includes a generally circular opening 52 formed in a top wall 54 thereof, the opening 52 defined by a wall portion 56 and communicating with an interior chamber 58 formed by the walls of the housing, and the circular wall portion 56 closely encircling and supporting the cylindrical outer surface of the paint bucket B.

Preferably and to enhance vertical stability of the bucket B relative to the frame, a recess or depression 60 having a generally cylindrical wall portion 62 is formed in the top side 14 of the frame. The recess 60 is superposed by and generally concentric to the circular opening 52 formed in the housing 48 and is configured to nestingly receive the bottom end portion of the bucket B. The circular wall portions 56 and 62 of the opening 58 and recess 60 are dimensioned to closely encircle the outer periphery of the paint bucket and to stabilize the bucket in such a manner that the bucket will not tip over during transportation of the bucket to a work site.

As is conventional, a paint roller comprises a roller portion 64 that is detachably connectable to one or more handle portions 66. In some applications, the painter desires to transport the roller and handle portions 64 and 66 in disassembled form to the work site whereupon the portions are assembled.

To enable the ease of transport and assembly, the enclosure 50 includes a top surface 68 in juxtaposition with the bucket B, the top surface 68 communicating with a first chamber 70 for receiving the roller portion 64, and a second chamber 72 for receiving and positioning the handle portions 68. Preferably, the handle portions 68 are vertically disposed and extend, at least in part, above the top surface 68 of the housing 50. Additionally, if desired, the enclosure 50 may be configured in a manner as described hereinabove with respect to the enclosure 36 to include a chamber for storing and transporting other supplies used in the painting operation, such as masking tape, cleaner, rags, and the like.

Although the housing 48 and enclosure 50 are shown as being formed by wall panels, an array of elongated rods or beams could be interconnected at their respective ends to form a frame-like structure above the frame 12, which structure functions to captivate the bucket for transport and use.

Similarly, for making a four point engagement with the exterior of the bucket, the housing 30 could comprise a stepped abutment proximate the handle 24 for engaging one side of the bucket, the stepped abutment extending transversely and between the lateral sides 22, a pair of longitudinally extending barriers for engaging two other sides of the bucket, the barriers extending in parallel juxtaposed relation along the sides 22, and the enclosure 36 forming an abutment for engaging the fourth side of the bucket.

An advantage of such structures would be reduced costs of manufacture and reduction of weight.

Another preferred embodiment of a multipurpose caddy for a painter is shown by reference to FIGS. 5A and 5B, the caddy generally being denoted by the number 210. The caddy 210 is similar to the caddy 10 and includes the frame 12, the handle 24, an array of casters and rollers 26 and 28 extending vertically downwardly from the bottom of the frame, and the structure 30 and 36 or 48 and 50 described hereinabove for supporting paint apparatus.

Importantly, two pairs of swivelable rollers 26 and two pairs of non-swivelable casters 28 are provided, including a first pair of rollers 26 at the forward end of the frame and a second pair of rollers 26 at the rearward end of the frame. The casters 28 are located centrally of the caddy, longitudinally spaced from one another, and positioned between the two respective pairs of rollers 26.

Preferably, the rollers 26 are of a first diameter, and the casters are of a second diameter, the second diameter being greater that the first diameter. Generally the rollers and casters are positioned so as to be proximate a respective lateral side of the frame 12. While the frame supports are referred to as rollers and casters, it is to be understood that the rollers and casters broadly include the term wheel. Further, the rollers are referred to as being "swivelable" in that the roller enables horizontal rolling as well simultaneously permitting rotation about a vertical axis. The casters are referred to as being "nonswivelable" in that the wheel rotates about an axis (or axle) extending laterally between the opposite sides of the frame.

As shown in FIG. 5A, during normal operation, the ground engagement points of the casters 28 maintain the frame 12 in generally parallel spaced apart relation from the ground, and the rollers 26 are spaced upwardly from contact with the ground. In general, the ground engagement points of the casters 28 are in a common first plane spaced from the frame by a first distance, and the engagement points of the rollers 26 are in a common second plane spaced from the frame by a second distance, the first distance being greater than the second distance.

Upon encountering an obstacle "O", the frame 12 is tilted and the opposite ends of the frame are lifted and or lowered to enable the frame to pass over the obstacle.

As shown in FIG. 5B, a counterclockwise torque or turning force "T" is applied to the handle 24 and the rearward end of the frame adjacent to the handle 24 is forced downwardly. As a result, the rearward end of the frame proximate to the handle pivots relative to the rearward casters 28, the rollers 26 adjacent to the handle are forced downwardly and into engagement with the ground, and the forward end of the frame distal to the handle and the forward casters 28 (and rollers 26) thereat are lifted from engagement with the ground. The first plane defined by the casters 28 is disposed at an angle "C" to the ground.

As viewed in FIG. 5B, the caddy 210 is moved to the right in the direction "D" and the forward rollers 26 and casters 28 past the obstacle, whereupon the forward end of the frame is lowered. The caddy is pushed further to the right until the rearward casters 28 (proximate to the handle) reach the obstacle.

At such time, a clockwise torque or turning force "T" is applied to the handle 24 and the rearward end of the frame (adjacent to the handle 24) is lifted upwardly. As a result, the frame 12 pivots relative to the forward casters 28, the rollers 26 proximate to the handle are lifted upwardly, and the rollers 26 at the forward end of the frame (distal to the handle) are forced downwardly and into engagement with the ground. The caddy 210 is pushed past the obstacle and the rearward end of the frame then lowered, causing the rearward casters 28 to be brought into supporting relation with the ground.

Having described the invention, what is claimed is:

1. A multipurpose paint caddy, the caddy comprising:

a support frame, said support frame defining a forward end, a rearward end, and top and bottom sides, means for positioning at least one paint bucket on the top side of the frame, the means for positioning supporting the bottom of the paint bucket on the frame and positioning the top of the paint bucket upwardly therefrom for operable use with paint apparatus, means for storing paint apparatus for use on the top side of the frame in juxtaposition with said means for positioning a paint bucket, the means for storing including an elevated support, upwardly from the top side of said frame, for nesting a paint tray therewithin and in operable relation with the top of the paint bucket, means for supporting the frame for rolling movement on the ground, and means for maneuvering said frame, said means for maneuvering including at least in part said means for supporting, wherein said means for supporting comprises a first and second pair of swivelable casters, respectively, at the forward and rearward ends of the frame and spaced a first distance from the bottom side of the frame such that the ground engaging surfaces of the casters are coplanar, and a pair of non-swivelable casters at the center of the frame and spaced a second distance from the bottom side thereof, the second distance being greater than the first distance such that the ground engaging surfaces of the non-swivelable casters are farther from the frame than said swivelable casters, and, wherein the arrangement of swivelable and non-swivelable casters enables the frame to tilt and the caddy to obviate obstacles encountered during movement of the caddy.

2. The paint caddy as claimed in claim 1, further wherein the means for positioning a paint bucket comprises a housing, the housing forming an upwardly open enclosure with at least one wall portion of the enclosure being configured to encircle and position the paint bucket for vertical orientation above the top side of the frame.

3. The paint caddy as claimed in claim 2, wherein the wall portion is circular in shape.

4. The paint caddy as claimed in claim 2, wherein the wall portion is comprised of wall segments dimensioned to closely encircle the paint bucket, said segments being spaced upwardly from the top side of said frame for encircling a medial portion of the paint bucket.

5. The paint caddy as claimed in claim 1 wherein:

said frame includes a recess to nestingly receive and encircle the bottom end portion of the bucket, and said means for positioning includes a housing wall provided with an opening sized to encircle a medial portion of the bucket, wherein the recess and opening are vertically spaced from one another and cooperate to provide vertical stability of the bucket relative to the frame and to inhibit the bucket from tipping over.

6. The paint caddy as claimed in claim 1, wherein a second pair of non-swivelable casters are disposed at the center of the frame and spaced said second distance from the bottom side thereof, the ground engaging surfaces of the non-swivelable casters being generally coplanar and in a plane that is generally parallel to the plane of the swivelable rollers.

7. The paint caddy as claimed in claim 6, said means for maneuvering comprises a manually grippable handle extending vertically from the rearward end of the frame to enable the user to push the frame horizontally as well as to apply upward and downward vertical forces to the frame, and said first and second pairs of non-swivelable casters, wherein the downward force on the handle operates with the rearward pair of non-swivelable casters to simultaneously pivot the rearward end portion of the frame downwardly and the respective rollers thereat into engagement with the ground and lift the forward end portion of the frame upwardly and the respective rollers and casters proximate thereto from the ground to enable movement of the forward end of the frame over an obstacle in the path of the frame, and conversely, the upward force on the handle operates with the forward pair of non-swivelable casters to simultaneously pivot the forward end of the frame downwardly and the rollers proximate thereat into engagement with he ground and lift the rearward end portion of the frame upwardly and over an obstacle in the path of the frame.

8. A multipurpose paint caddy, the paint caddy comprising:

a support frame, the support frame having a top, a bottom, a pair of laterally spaced opposite sides, a front, and a rear;

means for positioning a paint bucket on the top of said frame;

a grippable handle extending from the frame for pushing and manipulating the frame, the handle enabling the user to apply forces used to lift up and/or push down one or the other end of said frame;

a pair of vertically spaced generally concentric ring frames, one and the other of said frames being proximate to and spaced vertically from the top of said frame and dimensioned to encircle the bottom and medial portions of the paint bucket;

a first and second pair of wheels extending downwardly from the bottom of said frame and the wheels of each pair being proximate to a respective of said opposite sides, said first and second pairs of wheels being disposed between the forward and rearward ends of the frame and adapted to be normally disposed in engagement with the ground to enable movement of the frame along the ground; and a third and fourth pair of wheels extending downwardly from the bottom of said frame and the wheels of each pair being proximate to a respective of said opposite sides, said third pair of wheels being disposed between the forward end and said first pair of wheels, and said fourth pair of wheels being disposed between said rearward end and said second pair of wheels, said third and fourth pair being spaced from the frame by an amount less than the said first and second pairs of wheels, wherein a downward force on the handle rotates the frame relative to the second pair of wheels and drives the rearward end and said fourth pair of wheels downwardly into engagement with the ground and lifts the forward end and the first pair of wheels from engagement with the ground, and oppositely, an upward force on the handle rotates the frame relative to the first pair of wheels and drives the forward end and said third pair of wheels downwardly and into engagement with the ground.

9. The paint caddy as claimed in claim 8, wherein the wheels of said first and second pairs of wheels are substantially of a like first diameter, and the wheels of said third and fourth pairs of wheels are substantially of a like second diameter, the first diameter being greater than said second diameter.

10. The paint caddy as claimed in claim 8, wherein the wheels of said first and second pairs of wheels are mounted non-swiveling rotation movement about respective axes extending laterally between the opposite sides of the frame, and the wheels of said third and fourth pairs of wheels are mounted for rolling swiveling movement.

11. The paint caddy as claimed in claim 8, wherein said means for positioning comprises a shaped enclosure projecting upwardly from the top of said frame and terminating in a top wall, said top wall including an opening sized to pass said bucket and closely encircle the outer surface of a medial portion of the bucket so received by the enclosure.

12. The paint caddy as claimed in claim 11, further comprising means for storing apparatus and paint, said means for storing being disposed proximate to the forward end of and extending upwardly from the top of said frame.

13. The paint caddy as claimed in claim 12, wherein said means for storing includes a first and second receptacle, respectively, for receiving paint apparatus such as paint brushes and paint rollers and a paint tray in which paint to be applied by the paint rollers is placed for use.

14. The paint caddy as claimed in claim 8 wherein the handle is U-shaped.

15. The paint caddy as claimed in claim 8 wherein the handle is T-shaped.

16. A method of facilitating painting, comprising the steps of:

providing a caddy having forward and rearward ends, a top, a bottom, a pair of first wheels disposed at the forward end and at the rearward end of the caddy, and two pairs of second wheels disposed centrally of the caddy and between the two pairs of first wheels, said wheels extending downwardly from the bottom with the second wheels extending further from the caddy than said first wheels and normally supporting the caddy for movement along the ground, and a handle extending from the top rearward end of said caddy for maneuvering the caddy, supporting a paint bucket in a containment housing projecting upwardly from the top of said caddy, said supporting positioning an engagement wall of the housing in encircling relation with a medial portion of said bucket, applying force to the handle to move the caddy along the ground to a desired paint location or until coming into confronting relation with an obstacle to be avoided prior to reaching said location, applying a torque to the handle to simultaneously pivot the rearward end of the caddy relative to the rearward pair of second wheels and drive the rearward pair of first wheels toward and into engagement with the ground and lift the forward respective pairs of first and second wheels from the ground and the forward end of the caddy above the obstacle, substantially simultaneously pushing the caddy over the obstacle and lowering the forward pair of second wheels and pushing the rearward pair of second wheels to the obstacle, applying a torque to the handle to simultaneously pivot the forward end of the caddy relative to the forward pair of second wheels and drive the forward pair of first wheels toward and into engagement with the ground and lift the rearward respective pairs of first and second wheels from the ground and the rearward end portion of the caddy above the obstacle, and substantially simultaneously pushing the caddy over the obstacle and lowering the rearward pair of second wheels into engagement with the ground.

17. The method as claimed in claim 16, including the steps of:

supporting paint apparatus in the form of paint to be used and paint applicators in respective chambers provided in a containment structure in juxtaposition with the top end of the paint bucket.

18. The method as claimed in claim 16, the steps of the method include configuring the first and second wheels for rotation about respective horizontal axes extending between the opposite lateral sides of the caddy, and further configuring the first wheels for rotation about respective vertical axes to said caddy.

* * * * *